Patented Aug. 7, 1928.

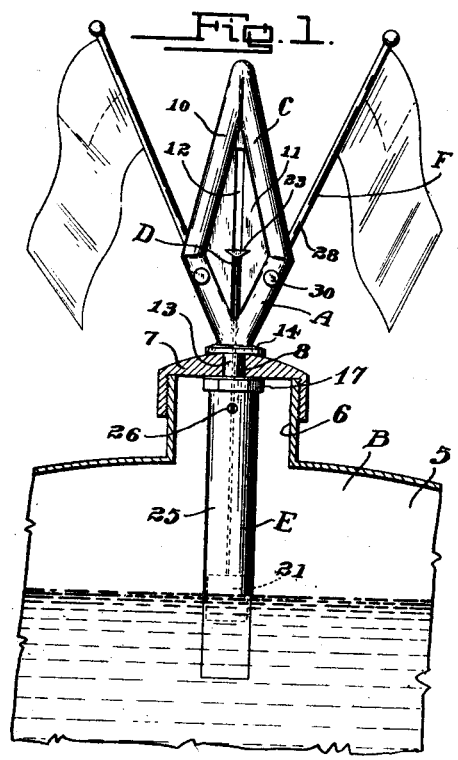

1,679,451

UNITED STATES PATENT OFFICE.

LYLE J. VAN DUZER, OF LOS ANGELES, CALIFORNIA.

LIQUID-LEVEL INDICATOR.

Application filed August 12, 1921, Serial No. 491,793. Renewed September 22, 1924.

This invention relates to attachments for motor vehicles.

The general object of the invention is to provide a combined radiator cap and means for indicating the level of the water in the radiator.

A further object of the invention is to provide a novel water gauge for automobile radiators including a float and an indicator associated with the float for showing the water level.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a front elevation of the improved radiator cap ornament and radiator water gauge, showing the same connected to an automobile radiator, the radiator being shown in section.

Figure 2 is an enlarged longitudinal vertical section through the improved radiator cap ornament and water gauge, showing the same connected with a radiator cap, the radiator cap being shown in fragmentary section.

Figure 3 is a detail enlarged perspective view of the upper end of the novel pointer and guide for the upper end of the float rod, and Figure 4 is a detail horizontal transverse section taken on the line 4—4 of Figure 2.

Referring to the drawings in detail, wherein similar reference characters designate corresponding parts throughout the several views, the letter A indicates the improved radiator cap ornament and water gauge, and B an automobile radiator, with which the same is associated.

The radiator B includes the usual body 5, having the filler neck 6, which is adapted to be closed by the ordinary type of radiator cap 7. This cap 7 may be associated with the neck 6 in any preferred manner. As shown the cap is threaded on the neck. The cap 7 is provided with a central axial bore 8, for the reception of the combined radiator cap ornament and water gauge A.

The improved ornament and water gauge A includes the head C, the float structure D; the guard E for the float structure; and F, the flags or pennants for association with the head C. The head C forms an important part of the invention, and is made in such a way as to please the æsthetic taste of the trade and to add a finished appearance to the vehicle, with which it is associated.

As shown, the head C is substantially arrow or diamond shaped, and is provided with a relatively heavy marginal rim 10, which can be formed elliptical or circular in cross section, if so desired. A relatively thin body portion 11 lies inwardly of the relatively heavy rim 10 and the body is provided with a centrally disposed vertically extending guide slot 12. The lower end of the head C is provided with a reduced stem 13, which is adapted to snugly fit in the bore 8 formed in the radiator cap 7. A collar or flange 14, is formed about the stem 13, and is arranged to engage the outer surface of the radiator cap 7. If so desired, a suitable flexible packing washer or the like 15 can be interposed within the flange 14 and the radiator cap 7, in order to insure against the leakage of water and the like from between the radiator cap and the head. The lower end of the stem 13 is externally threaded as at 16 for the reception of a retaining nut 17, which is adapted to firmly engage the lower surface of the cap 7. If found desirable a suitable compressible washer or the like 18, can be interposed between the cap 7 and the nut 17, in order to insure against the leakage of water through the cap.

The nut 17 also supports the guard E, which will be hereinafter more fully described.

The float structure D includes the vertically disposed float rod 20, and the float 21. This float 21 may be constructed of cork suitably varnished or it can be formed of a hollow metallic casing. The rod 20 is shown as secured to the float 21. It is slidably arranged in a bore 22 formed in the stem 13, the flange 14 and the lower end of the rim 10. The upper end of the float rod has rigidly secured thereto in any preferred manner, the novel pointer 23, which will now be described. The pointer 23 is preferably formed from a single sheet of bendable sheet metal and includes the substantially triangularly shaped wings or side walls 24, which are connected at their lower edges by a bight portion or lower wall 25'. The opposite ends of the wings or side walls 24 are adapted to slidably engage the opposite faces of the flat plate or body 11, and form means for guiding the float rod during its movement, as well as means for indicating the position of a float or the level of water in the body 5 of the radiator B. If desirable, the wings 24 may be painted a suitable color in order to permit the same to be readily seen, and if desirable, the paint may be of a luminous nature in order to facilitate the seeing of the pointer at night.

Upon the assembly of the improved device, the rod 20 is inserted through the bore 22, and the pointer 23 is disposed longitudinally in relation to the slot 12 and placed into the slot, and then moved at right angles which will position the corners or edges of the wings 24 on opposite sides of the body or plate 11.

The upper end of the rod 20 is then threaded into the connecting wall 25' or secured thereto by solder or the like.

The guard E for the float 21 includes a hollow cylindrical body 25, the upper end of which is connected to the nut 17 in any suitable manner, such as by solder or the like. This guard 25 extends into the water in the radiator and prevents the water from acting against the float during the turning of sharp corners or the disturbing of the water by the circulating pump. The cylindrical body 25 adjacent to its upper end is provided with an inlet opening 26, and it can be seen that in case the engine becomes overheated, the steam will escape from the radiator through the opening 26, through the bore 22 and out through the slot 12. Thus it can be seen that upon the slightest formation of steam, the attention of observers will be immediately called to this fact by the escaping of the steam through this slot.

The novel head C is also so formed as to support the flags, emblems or pennants F, in an artistic manner upon patriotic holidays and other occasions. The rim 10 at a point below the transverse center thereof is provided at its opposite sides with inwardly extending bores 27, which open out through the rim at a point below the transverse center, and these bores are adapted to receive the staffs 28 of the flags or pennants F. Suitable set screws 30 are threaded into the rim 10, and are adapted to impinge against the staffs 28, in order to hold the emblems against accidental displacement.

From the foregoing description, it can be seen that an improved flag holder and water gauge has been provided for the radiators of automobiles, which is so constructed, as to not only be durable and efficient in use, but to present a pleasing appearance to the eye, and thus please the æsthetic taste of the trade.

If found desirable or necessary, the plate or body 11 can be marked with suitable indications or indicia to indicate the normal position that the pointer should be in when the radiator is filled with water and to indicate danger or the lower position of the pointer in which the machine will need water.

I claim:

1. A water gauge for automobile radiators comprising a head including a relatively thick marginal rim, and a thin plate extending inwardly therefrom, the plate having an open guide slot formed therein, a depending stem formed on said head and having a bore therein arranged in direct alignment with the guide slot, a float rod slidably mounted in said bore and having its upper end movable in said slot, said rod having a pointer thereon comprising a body portion secured to said float rod and indicating portions each projecting through one side of said slot, said indicating portions each coacting with a portion of one side of said head to prevent lateral play of the upper end of said rod, and a float adapted to coact with said rod.

2. An attachment for radiators comprising a head including a flat body plate having a longitudinally extending slot formed therein, a heavy marginal rim surrounding the body plate and projecting from each face thereof, a reduced stem formed on the head having a longitudinally extending bore therein communicating with the slot, a float, a float rod carried by the float and extended through the bore, a pointer carried by the upper end of the float rod slidably mounted in the slot, and plates formed on the pointer arranged to slidably engage the opposite faces of the flat body plate and disposed wholly within the space bounded by said marginal rim.

3. A water gauge for automobile radiators, comprising an arrow shaped head including a flat body plate and a heavy marginal rim, the body plate having a guide slot formed therein, a depending stem formed on the head having a bore therein arranged in direct alignment with the guide slot, a float rod slidably mounted in said bore, a float secured to the lower end of the rod, a pointer secured to the upper end of the rod and mounted for sliding movement in said slot, the pointer being formed of sheet metal and including substantially parallel spaced triangularly shaped wings and a connecting bight portion, the outer ends of the triangular shaped wings slidably engaging the opposite faces of the body plate in order to form a guide for the upper end of the float rod.

LYLE J. VAN DUZER.